United States Patent
Grabowski et al.

[11] Patent Number: 5,897,780
[45] Date of Patent: Apr. 27, 1999

[54] METHOD AND FACILITY FOR TREATING WATER CONTAMINATED WITH WARFARE AGENTS

[75] Inventors: Alexander Grabowski, Munster; Michael Dolle, Egestrof; Ingo Haser, Emmelshausen, all of Germany

[73] Assignee: Fed. Republic of Germany, Federal Defense Ministry, Kolbenz, Germany

[21] Appl. No.: 08/849,913

[22] PCT Filed: Dec. 22, 1995

[86] PCT No.: PCT/EP95/05113

§ 371 Date: Jun. 18, 1997

§ 102(e) Date: Jun. 18, 1997

[87] PCT Pub. No.: WO96/20135

PCT Pub. Date: Jul. 4, 1996

[30] Foreign Application Priority Data

Dec. 23, 1994 [DE] Germany .............................. 44 46 211

[51] Int. Cl.⁶ .................................................. B01D 61/00
[52] U.S. Cl. ......................... 210/652; 210/651; 210/774; 210/195.1; 210/175; 210/181
[58] Field of Search .................................... 210/652, 651, 210/195.1, 774, 175, 181

[56] References Cited

U.S. PATENT DOCUMENTS

| 4,865,726 | 9/1989 | De Vries ................................. 210/137 |
| 5,244,579 | 9/1993 | Horner et al. .......................... 210/652 |
| 5,538,641 | 7/1996 | Getty et al. ............................. 210/652 |

FOREIGN PATENT DOCUMENTS

| 0352779 | 7/1989 | European Pat. Off. . |
| 300751 A7 | 10/1983 | Germany . |

OTHER PUBLICATIONS

Chemical Abstract 117:5555d, 1992.
Desalination, 75(1989) 363–378, Els. S. Pub.
Chemical abstract 88:141236k, 1978.
Handbook of Water Purification Walter Lorch, pp. 318–329, McGraw Hill Book Co.

*Primary Examiner*—Ana Fortuna
*Attorney, Agent, or Firm*—Omri M. Behr, Esq.

[57] ABSTRACT

In order to treat water contaminated with warfare agents and containing less than 500 ppm of salt, a separation stage 10 is normally provided downstream of the reverse osmosis. In the separation stage, the untreated water is divided into residue and permeate. Warfare agents have the property of acting as softeners on the semi-permeable organic polymer membranes of separation stages. As a result of this, the warfare agents pass through the membranes of separation stages in increasing quantities once the latter have been in operation for a few hours. In order to improve the treatment of water contaminated with warfare agents, salt is added to the untreated water which, with a salt content of over 1000 ppm, is then drawn through the separation stage 10 down stream of the reverse osmosis stage. The invention is suitable for use with mobile facilities used for producing drinking water.

16 Claims, 1 Drawing Sheet

METHOD AND FACILITY FOR TREATING WATER CONTAMINATED WITH WARFARE AGENTS

FIELD OF THE INVENTION

The invention is directed to a process for treatment of warfare agent contaminated waters having a salt content of under 500 ppm, wherein crude water led, in a separation step operating in reverse osmosis mode to a semipermeable membrane formed of organic material, are divided into retentate and permeate and a facility for the treatment of water contaminated with warfare agents having a salt content under 500 ppm, comprising a separating step operating in reverse osmosis mode, having a semipermeable membrane formed of organic material, wherein the separating step is connected on the one side with a crude water conduit and a retentate conduit and on the other side with a permeate conduit.

DISCUSSION OF THE PRIOR ART

Such a process and such a facility are disclosed in EP-0 35 27 79 B1. This process however is only limited to the treatment of warfare agent contaminated sweet waters. Since warfare agents have the property that they operate as softening agents on the semipermeable organic polymer membranes in the separation stages.

This leads thereto that the warfare agents pass through the membranes of separation stages in increasing quantities once the latter have been in operation for a few hours.

SUMMARY OF THE INVENTION

Purpose of the present invention is starting from the known procedure, to improve the treatment of waters contaminated with warfare agents.

This task is solved by providing that the crude water is salinated by a salt dosing arrangement to a salt content of greater than 1,000 ppm and led to the separating step operating in reverse osmosis mode.

The advantage of the present invention lies therein that the membranes of the separation stage operating in reverse osmosis made, even after an extended working time, no longer permit the warfare agents to proceed therethrough in unacceptable amounts. Expressed in other words, the membranes retain their blocking action against the warfare agents independent of time of operation.

A further advantage of the invention lies therein that, in consequence of the higher retention rate achieved by salination, the membranes for the decontamination of a given amount of water per unit time, there may be utilized a facility of lower efficiency than would be the case in conventional facility concepts.

The warfare agents to be separated are set forth, for example, in the (translation) Textbook of Military Chemistry, 2nd. Ed., Military Publishing Facility of the German Democratic Republic, 1977. From experience, the separable warfare agents are nerve warfare agents such as those of the V-type, of the G-type, such as sarin or tabun, and combat agents in the form of arsenic compounds such as Lewisite, or Lost, such as nitrogen Lost.

The limit concentrations for these combat agents in water are, for VX at a maximum of 20 ppb in accordance with the NATO Standardization Agreement, STANAG 2136 and for the contained in arsenic Lewisite at 100 ppb in accordance with the German Potable Water Regulation. On the other hand, the concentration of these combat agents dissolved in water can, in a serious case, be as high as 10 ppm.

In accordance with the present invention, it has been determined that these warfare agents can be particularly efficiently separated by reverse osmosis when the contaminated drinking water is at the same time mixed with salt. In accordance with the present invention, the salt content of contaminated drinking water should lie above 1,000, preferably above 2,000, and in particular above 3,000 ppm, wherein such ratio is in terms of parts by weight.

As salts, there may be utilized any hygienically harmless salt, in particular common salt.

As reverse osmosis entities, there may be advantageously utilized reverse osmosis membranes which are utilized in the desalination of sea water.

The membranes made of organic polymers can for example comprise polypropylene, polyamide, polysulfone or acetate. Alternatively however, composite membranes may be utilized such as those sold by the company Filmtec. These membranes typically have a salt retention level of greater than 99% and can tolerate pressures up to 6.9 MPa and operating temperatures up to 45° C.

Advantageously, such reverse osmosis entities can be provided sequentially or in cascade form in order to improve the level of separation. Thus, the permeate separated from the first step is fed to a second or further step and there again subjected to reverse osmosis.

In accordance with the present invention, the crude water is salinated, which is exactly the opposite of the usual procedure for obtaining drinking water. Since with increasing salt content of the crude water, the pressure required on the crude water to drive the separation step, is increased. In a completely surprising manner, it has shown found that by salination the chemical stability of the membranes against the warfare agents is maintained. The advantage that one obtains by raising the stability of the membrane overweighs substantially the disadvantage which comes from the salination of the crude water.

It has been surprisingly shown that already by the salination of the aforementioned levels, an improvement are in the separation of the warfare agents of the order of 30 to 50% is obtained, is since at the beginning of the separation, the separation rates under the addition of salt to contaminated water are better by this amount. Thus the separation rate of VX from a test water mixed with approximately 10 ppm VX, in a run through a reverse osmosis test apparatus without the addition of salt was held, in the first two hours, at a level of 5 to 8 ppb, whereas under the addition of 3,000 ppm of common salt to the water, the separation rate drops to 2 to 5 ppb and thus in both cases falls below the limit of 20 ppb. Additionally, the unexpected effect occurs that even after several hours the separation rate of the warfare agent with the salinated water, is practically unchanged, whereas with the unsalinated water, it rises above the critical limit of 20 ppb.

In accordance with a preferred embodiment, the treated retentate can be brought to an arrangement for the chemical and/or physical destruction of the warfare agents. In such an arrangement the retentate continually or discontinually runs to this unit in which the warfare agents are dissociated to harmless chemical combinations.

Thus, for example VX, in such an aggregate, can be dissociated in the supercritical region at a pressure of a least 219 bar and a temperature of 375° C. The thus treated streams can, for example under the separation of the dissociation products, again be led to the water handling circuit.

In the preferred embodiments of the invention the salt content exceeds 2,000, in particular more than 3,000 ppm, suitably using common salt.

It has been found desirable to provide that the retentate is recirculated into the circuit of the separation step 10 and that at the beginning of the treatment, salt is added to the retentate for salination of the crude water.

Suitably, the warfare agents accumulating in the retentate, at least in a partial stream of the retentate circuit, are either continually or discontinually dissociated. Most suitably, this is achieved by dissociation by a pressure of at least 219 bar and a temperature of at least 375° C. in an aggregate. Desirably, the retentate stream led to the aggregate 30 is prewarmed in a heat exchanger with a stream leading from said aggregate. Suitably, the carrying out of the treatment comprises a measuring arrangement 4 for measuring the salt content of the crude water led to the separation step 10, connected with the crude water conduit.

Desirably, there is provided a retentate conduit 12 for recycling of the retentate in the circuit to the separation step 10 which is connected with the crude water conduit 11 via conduit segments 12a, 12b. Furthermore, an aggregate 30 for the dissociation of the warfare agent accumulating in the retentate circuit is inserted into a partial stream of the retentate circuit and an aggregate circuit 18 which exists from the retentate conduit 12 is led back to the retentate circuits 12, 12b.

BRIEF DESCRIPTION OF THE DRAWINGS

The invention may further be illustrated by the drawings which show as follows.

DETAILED DESCRIPTION OF THE INVENTION

Figure 1:
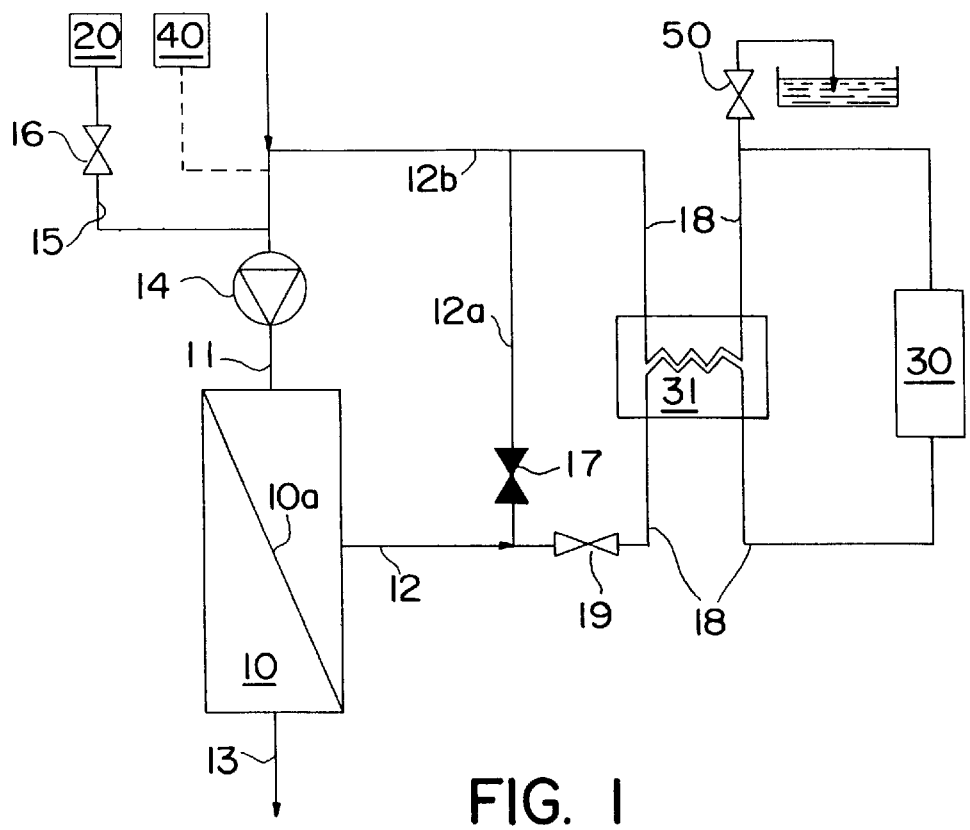
FIG. 1 The separation step in a reverse osmosis process as a schematic diagram.

FIG. 1 shows a segment of a facility for the processing of waters contaminated with warfare agents with a salt content of less than 500 ppm. The waters to be treated can, for example, be stream, lake, or ground waters. The illustrated segment of the facility is directed to a separation step 10 which operates in accordance with the principles of reverse osmosis and comprises a semipermeable membrane made of an organic material. The semipermeable membrane 10a divides the separation step 10 which it is connected with a crude water conduit 11 and a retentate (should be retentate) conduit 12 on one side of the membrane and is connected with permeate conduit 13 on the other side of the membrane.

Upstream of the separation step 10 a pressure pump 14 is provided in the crude water conduit 11 which produces the required working pressure to obtain the separation of the warfare agent at the membrane, whereby there is provided a retentate with enriched warfare agent content and a permeate which is warfare agent poor. It should be noted that the crude water provided to separation step 10 has already been pretreated with a fine meshed filtering arrangement which is not illustrated.

The problem in the treatment of warfare contaminated waters rests therein that the warfare agents dramatically reduce the service life of the separation steps which operate in the reverse osmosis mode. This is because the semipermeable membranes made of organic polymers are softened by the warfare agents. Thus, the warfare agents penetrate the semipermeable membrane in increasing amounts with operating time and arrive in the permeate. Curve A in FIG. 2 illustrates this and shows the concentration c" of the warfare agent in the permeate already exceeds the permitted value c"G after a few hours of operation.

Figure 2:
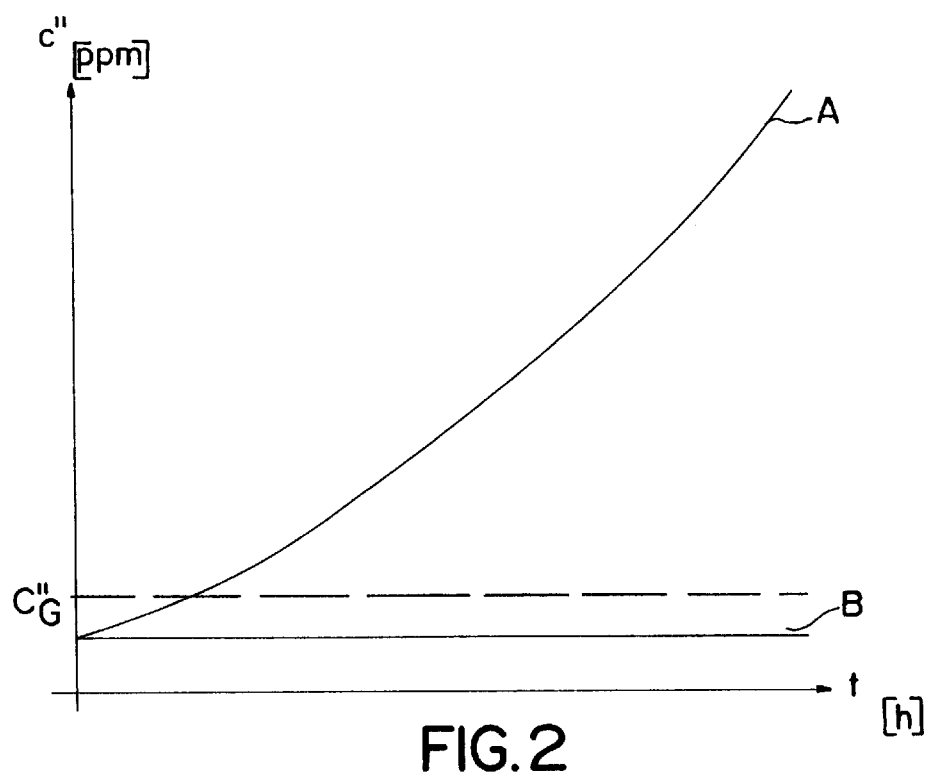
FIG. 2 A diagram to illustrate that through the salination of the contaminated water, the membrane remains stable with respect to the warfare agents.

The above-mentioned limit lies, as previously mentioned, for warfare agents of the type VX, at 20 ppb and is shown in FIG. 2 with a dotted horizontally running line.

In order to stabilize the membrane with respect to the warfare agents, the crude water is salinated with a dosing arrangement 20 (FIG. 1) which is connected via connection conduit 15 with a first insulated valve 16, with the crude water conduit 11 and leads it with a salt content of more than 1,000 ppm, suitably more than 2,000 ppm, most preferably over 3000 (should be 3,000) ppm to the separating step 10 operating in the reverse osmosis mode. To monitor the salt content, there is provided a measuring arrangement 40 which is connected with the crude water conduit 11. This determination may readily occur by the determination of conductivity. As a result of salination, there is obtained the curve B of FIG. 2. According to this, the concentration c" of the warfare agent in the permeate is independent of the operating time t, is constant and below the permitted value $C_G"$.

The diagram shown in FIG. 2 is directed to the separation of VX warfare agent from drinking water, wherein the VX concentration in the crude water is about 17.5 ppm. The conductivity of the crude water itself was of the order of about 330 $\mu$S/cm, wherein the crude water had been salinated by the addition of common salt to a level of 3,000 ppm. The limit value of $C_G"$ is 20 ppb. The time coordinate is normalized on the breakthrough of Curve A through the limit value which in the illustrated experiment occurs after about 6 hours.

The salination in accordance with the preferred embodiment is most simply arranged in that the retentate obtained from the separation step is led back through the retentate conduit in a circuit to the crude water line 11 (SHOULD BE 11). For this purpose, the retentate line 12 via conduit branches 12a and 12b, is connected with the crude water conduit 11, wherein a further valve 17 is inserted into the circuit.

In order to obtain the salination in the simplest manner, in accordance with Figure, the retentate obtained in the separation step 10 is brought back into circuit. In this circuit, 11, 12, 12a and 12b by means of dosing arrangement 20, at the beginning of the treatment there is added so much salt that the predetermined minimum salt content is provided before separation step 10. If nothing is branched off from the retentate, the salt remains in the circuit of the retentate since only very small amounts of salt move over into the permeate. In contrast to the discarding of the retentate, the circuit system has the following advantages:

The amount of salt required for the salination is very small which simplifies the logistics.

The ratio of the water to be treated to the water contaminated with the warfare agent is very high.

However in conjunction with the desired advantages of a circulatory system, one also has to deal with the disadvantage that the concentration of the warfare agent increases with time.

To remedy this situation in accordance with an advantageous embodiment, the accumulating warfare agent in the circuit is dissociated in an aggregate 30. This can take place either continually or discontinually, wherein it is sufficient to dissociate the warfare agent in accordance with claim 1 in partial stream. For this purpose an aggregate circuit 18 runs off from the retentate conduit 12 into which the aggregate 30 is connected and which leads back to circuit 12a, b.

In aggregate 30, one builds up, at least for a short time, a pressure of at least 219 bar and heats the fluid flowing therethrough to at least 375° C. in order to dissociate the warfare agent. For this purpose, there is provided in aggregate 30, a pressure pump and a heating coil, neither of which are illustrated. In order to activate the aggregate circuit 18, there is provided a third valve 19 which operates together with the second valve 17, although in the opposite direction. This is illustrated in FIG. 1 by different shading of the valves.

The energy requirement for the aggregate 30 is high. In order to reduce this need, the cold stream which is led to aggregate 30 is heated by the hot stream leading therefrom. For this purpose, there is utilized heat exchanger 31 through which the aggregate circuit on the up-stream and downstream side is led.

For the salination of the crude stream, common salt is exceedingly suitable since it may be obtained everywhere and stabilizes the membranes of organic material against the warfare agents at relatively low concentrations.

After the commencement of the salination undertaken for the treatment, the salt content of the retentate led in the circuit rises because fresh crude water always has a certain salt content. In order to avoid the exceeding of the salt content of the retentate above a desired limit, warfare agent-free fluid is extracted via exit valve 50, which is located on the downstream side of the aggregate circuit 17 until, under the addition of fresh and salt-free crude water, the desired salt content is obtained.

The treatment of warfare agent contaminated water can proceed in an automatized fashion via memory programmable controlling. With such controls, all valves are independently opened and shut. Furthermore, the memory programmable controls monitor the temperature of the crude waters provided to separation step 10, so that the permissible operating temperature of the semipermeable membrane is not exceeded. Such a situation may occur when the retentate (should be retentate) for the dissociation of the warfare agent via aggregate 30 has not been sufficiently recooled.

ITEM DESIGNATION LIST

A Curve of the Prior Art Facility.
B Curve of the New Facility.
10 Separation step operating in accordance with reverse osmosis.
10*a* Membrane
11 Crude water conduit
12 Retentate conduit
12*a* Retentate conduit branch
12*b* Retentate conduit branch
13 Permeate conduit
14 Pressure pump
15 Valve
16 Valve
17 Valve
18 Aggregate circuit
19 Third valve
20 Dosing arrangement for salt
30 Aggregate for dissociation of warfare agents
31 Heat exchanger
40 Measuring arrangement
50 Valve

We claim:

1. A process for treatment of warfare agent contaminated waters having a salt content of under 500 ppm, comprising the steps of:

a) salinating crude feed water to a salt content of greater than 1,000 ppm, b) leading said salinated crude feed water to a separation system comprising a semipermeable membrane formed of organic material, operable in reverse osmosis mode, c) causing said crude feed water to be divided into a retentate upstream of said membrane and a permeate downstream of said membrane.

2. The process according to claim 1, wherein the salt content exceeds 2,000 ppm.

3. The process according to claim 2, wherein the salt content exceeds 3,000 ppm.

4. The process according to claim 1, additionally comprising the step of recirculating the retentate upstream of said separation system.

5. The process according to claim 4, additionally comprising recirculating the retentate to the crude feed water whereby salination is assisted.

6. The process according to claim 1, additionally comprising diverting at least part of the retentate as an input stream into a partial circuit containing a dissociating means for dissociating at least a part of the warfare agents accumulating in the retentate, and providing an exit stream from said means comprising the products of said dissociation.

7. The process according to claim 6, additionally comprising dissociating the warfare agents in the said partial circuit for dissociation.

8. The process according to claim 7, comprising discontinually dissociating said warfare agents.

9. The process according to claim 7, comprising continually dissociating said warfare agents.

10. Process according to claim 7, comprising dissociating said warfare materials in said dissociating means at a pressure of at least 219 bar and a temperature of at least 375° C.

11. The process in accordance with claim 10, additionally comprising warming the input stream to said dissociating means in a heat exchanger with said exit stream leading from said dissociation means.

12. The process in accordance with claim 1 wherein the crude water is salinated with common salt.

13. A facility for the treatment of water contaminated with warfare agents having a salt content under 500 ppm, comprising a) a separating system comprising a semipermeable membrane formed of organic material, operating in reverse osmosis mode, b) a crude water conduit and a retentate conduit connected to said separating means upstream of said membrane, c) a permeate conduit connected to said separating system upstream of said membrane, and d) a salt dosing arrangement for the salination of crude water to a level of above 1,000 ppm, connected with the said crude water conduit by means of a dosing connecting conduit, e) conduit segments connected with both the crude water conduit and the retentate conduit for recycling retentate to the separation system to form a retentate circuit, f) dissociation means for dissociation of the warfare agents accumulating in the retentate, g) a retentate input conduit means connected to said retentate circuit for passing a partial stream of said retentate circuit through said dissociation means, and h) dissociate exit conduit for passing the dissociated retentate from said dissociation means back to the retentate circuit.

14. The facility in accordance with claim 13 further comprising a measuring arrangement connected to the crude water conduit for measuring the salt content of the crude water flowing to the separating system.

15. The facility in accordance with claim 13, wherein the said dissociation means for the dissociation of the warfare material comprises a pressure pump in the partial stream of the retentate circuit for the achievement of at least 219 bar and a heating coil for the achievement of a temperature of about 375° C.

16. The facility in accordance with claim 15, further comprising a heat exchanger, located proximate to the dissociation means, said dissociate exit conduit and said retentate input means, passing through said heat exchanger for warming the retentate in the retentate input means with heat of the dissociate exit conduit.

* * * * *